Sept. 6, 1932.  H. PERROT ET AL  1,875,759
BRAKE
Filed Feb. 17, 1928   2 Sheets-Sheet 1
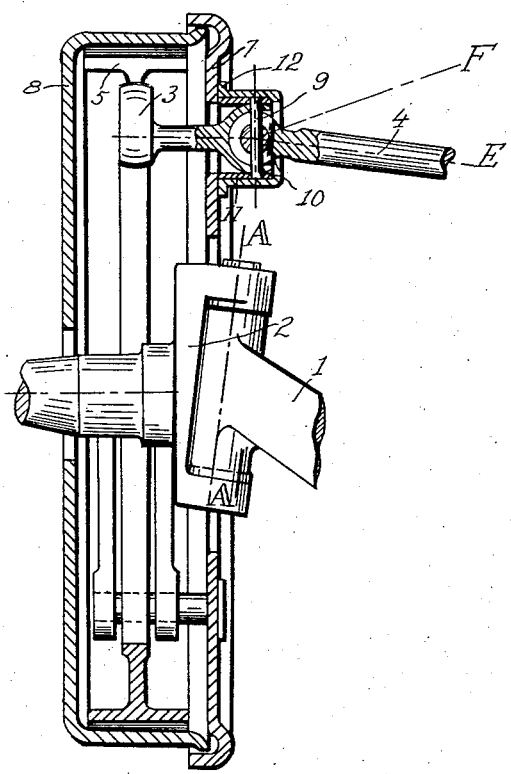
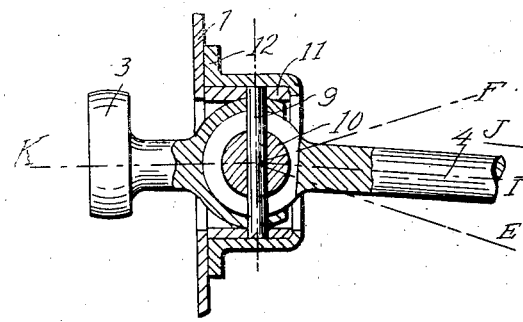
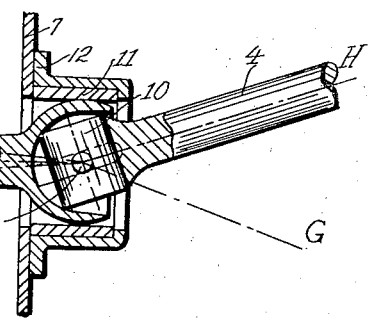
INVENTOR
HENRI PERROT
G. CALVIGNAC
BY
ATTORNEY Sept. 6, 1932.  H. PERROT ET AL  1,875,759
BRAKE
Filed Feb. 17, 1928  2 Sheets-Sheet 2
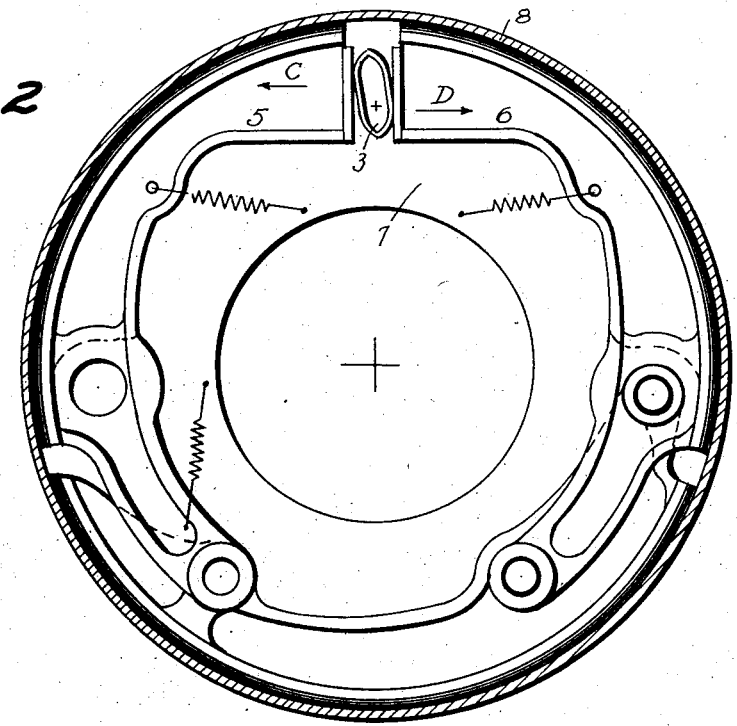
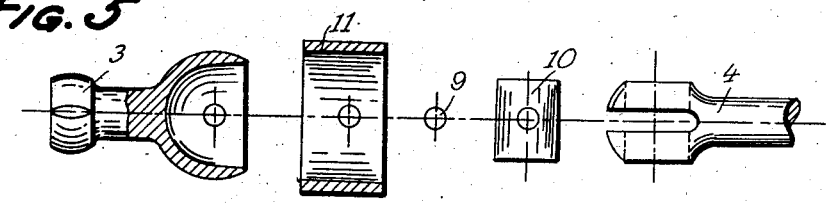
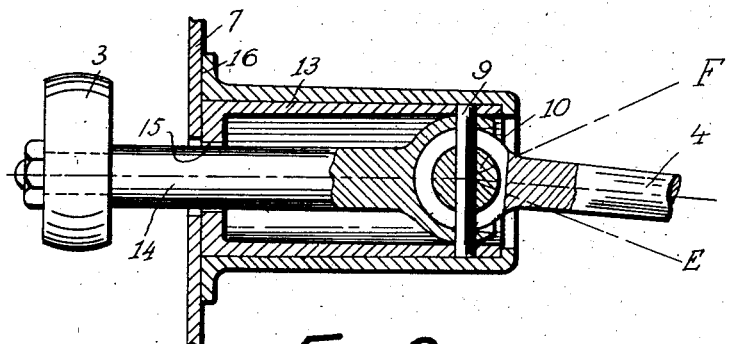
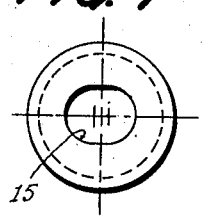
INVENTOR
HENRI PERROT
G. CALVIGNAC
BY
ATTORNEY Patented Sept. 6, 1932

1,875,759

UNITED STATES PATENT OFFICE

HENRI PERROT, OF PARIS, FRANCE, AND GERMAIN CALVIGNAC, OF MANNHEIM, BADEN, GERMANY, ASSIGNORS, BY MESNE ASSIGNMENTS, TO BENDIX AVIATION CORPORATION, OF NEW YORK, N. Y., A CORPORATION OF DELAWARE

BRAKE

Application filed February 17, 1928, Serial No. 254,943, and in France December 5, 1927.

This invention relates to brakes, and is illustrated as embodied in an internal expanding automobile brake. An object of the invention is to improve the construction and mounting of a cam or other applying device which can float to equalize or balance the pressures on the shoes. The specific nature of the improvements will be apparent from the following description of the illustrative embodiments shown in the accompanying drawings, in which:

Figure 1 is a section vertically through the assembled brake, showing the floating cam;

Figure 2 is a section through the brake at right angles to Figure 1, just inside the head of the brake drum, and showing the brake shoe in side elevation;

Figure 3 is a vertical section through the cam and its mounting, on a larger scale than Figure 1;

Figure 4 is a section through the cam at right angles to Figure 3;

Figure 5 is a view of the parts shown in Figure 4, but prior to assembly;

Figure 6 is a view corresponding to Figure 4 but showing a modification; and

Figure 7 is an end elevation of one of the elements of Figure 6.

The brake and wheel assembly illustrated in Figures 1 and 2 includes an axle 1 supporting a knuckle 2 for swiveling movement about an axis A—A corresponding to the center of a universal joint operating a novel cam 3 and connecting it to an operating shaft 4. The brake shoes 5 and 6 or their equivalents may be supported on a backing plate 7 arranged at the open side of the brake drum 8.

In Figure 2, the shoes 5 and 6 are shown applied by the cam 3, being forced apart in the direction of the arrows C and D. If the axis of cam 3 were absolutely fixed, it could force the shoe 5 against the drum 8 more strongly than the shoe 6 or vice versa. If, however, the axis of cam 3 can be displaced laterally, the axis will automatically shift to the center of pressure, with the shoes fully and equally applied.

In the arrangement shown, the cam 3 is entirely free to shift laterally about the vertical axis or pivot 9 of the universal joint, and can take the position OJ or OI (Figure 4), corresponding to the arrows C and D. The operating shaft 4, however, can shift in any direction about the center of the universal joint, either to positions OH and OG about pivot 9, or OE and OF about the horizontal pivot 10.

The cam 3, on the other hand, does not shift in any direction except about pivot 9, being held by fixing the pivot 9 at its ends in a hollow shaft or bushing 11 journaled in a bracket 12 carried by the backing plate 7.

The entire assembly, including cam 3, joints 9 and 10, and the shaft 4, supported by the hollow shaft 11, as it turns in support 12.

In forming the universal joint, the end of shaft 4 is enlarged to form a slotted and rounded head, as shown in Figure 4, received in a hollow hemispherical shell integral with cam 3. The cylindrical pivot or connector 10 passes through openings in the end of shaft 4, and itself has a central opening for the above-described pin 9.

In Figures 6 and 7 is shown a modification in which the cam 3 is mounted on a relatively-long shaft 14. In order to take the weight of the cam and shaft off the pivot 9, the hollow shaft 13 (corresponding to shaft 11) is formed with a head at its inner end which is slotted to provide a surface 15 slidably supporting the shaft 14.

While two illustrative embodiments have been described in detail, it is not our intention to limit the scope of the invention to those particular embodiments, or otherwise than by the terms of the appended claims.

We claim:

1. A floating cam assembly including a rotatable support carrying a pivot member forming part of a universal joint, in combination with a cam turned by said pivot and shiftable about said pivot and supported by said support.

2. A floating cam assembly including a hollow shaft forming a rotatable support carrying a pivot member forming part of a universal joint, in combination with a cam turned by said pivot and shiftable about said pivot and having a part extending into said hollow shaft.

3. Operating mechanism comprising, in combination, a rotatable member, a fixed bearing in which said member is journaled, and an operating device having a shaft pivotally connected to said member within said bearing said shaft being shiftable bodily about said pivot but restrained from shifting in other directions.

4. Operating mechanism comprising, in combination, a rotatable member having an opening at least in one end, a fixed bearing in which the end of said member having the opening is journaled, and an operating device having a shaft extending into said opening and connected to said member by a pivot extending diametrally through the member said shaft being shiftable about said pivot but restrained from shifting in other directions.

5. Operating mechanism comprising, in combination, a rotatable member having an opening at least in one end, a fixed bearing in which said member is journaled, and an operating device having a shaft extending into said opening and connected to said member by a pivot extending across said opening said shaft being shiftable bodily about said pivot but restrained from shifting in other directions, together with an operating shaft pivotally connected to a second pivot which is arranged at right angles to the first pivot and which is pivotally connected to the first pivot.

6. Operating mechanism comprising, in combination, a rotatable member having an opening at least in one end, a fixed bearing in which said member is journaled, and an operating device having a shaft extending into said opening and connected to said member by a pivot extending across said opening, said shaft being shiftable bodily about said pivot but restrained from shifting in other directions, together with an operating shaft universally jointed to said rotatable member.

7. Operating mechanism comprising, in combination, a rotatable member having an opening at least in one end, a fixed bearing in which said member is journaled, and an operating device having a shaft extending into said opening and connected to said member by a pivot extending across said opening, said shaft being shiftable bodily about said pivot but restrained from shifting in other directions, together with an operating shaft pivotally connected to a second pivot which is arranged at right angles to the first pivot and which is pivotally connected to the first pivot, together with an operating shaft extending into the opposite end of said opening from the first shaft and universally jointed to the rotatable member.

8. Operating mechanism for a brake or the like comprising, in combination, a fixed bearing, a member rotatably mounted in said bearing, a floating applying device pivotally connected to said member and arranged on one side of the bearing and an operating shaft universally jointed to said member and arranged on the other side of the bearing.

9. A brake comprising, in combination, a fixed bearing, a member rotatably mounted in said bearing, friction means having separable ends adjacent said bearing, a floating applying device acting with balanced pressures on said ends on one side of the bearing and operated by said member, and an operating shaft universally jointed to said applying device and arranged on the other side of the bearing.

10. Operating means comprising, in combination, two rotatable shafts arranged end to end and so jointed together, that one shaft may shift bodily about one axis only and the other shaft may shift about two axes substantially at right angles to each other, a rotatable member housing the connection between the shafts and a bearing for the rotatable member.

11. A floating cam assembly including, in combination, a cam and a shaft connected by a universal joint, said joint so constructed that the shaft may shift both in horizontal and vertical planes and that the cam may shift about the vertical axis of said joint, and a rotatable member housing said joint.

In testimony whereof, we have signed our names to this specification.

HENRI PERROT.
GERMAIN CALVIGNAC.